United States Patent Office
3,194,644
Patented July 13, 1965

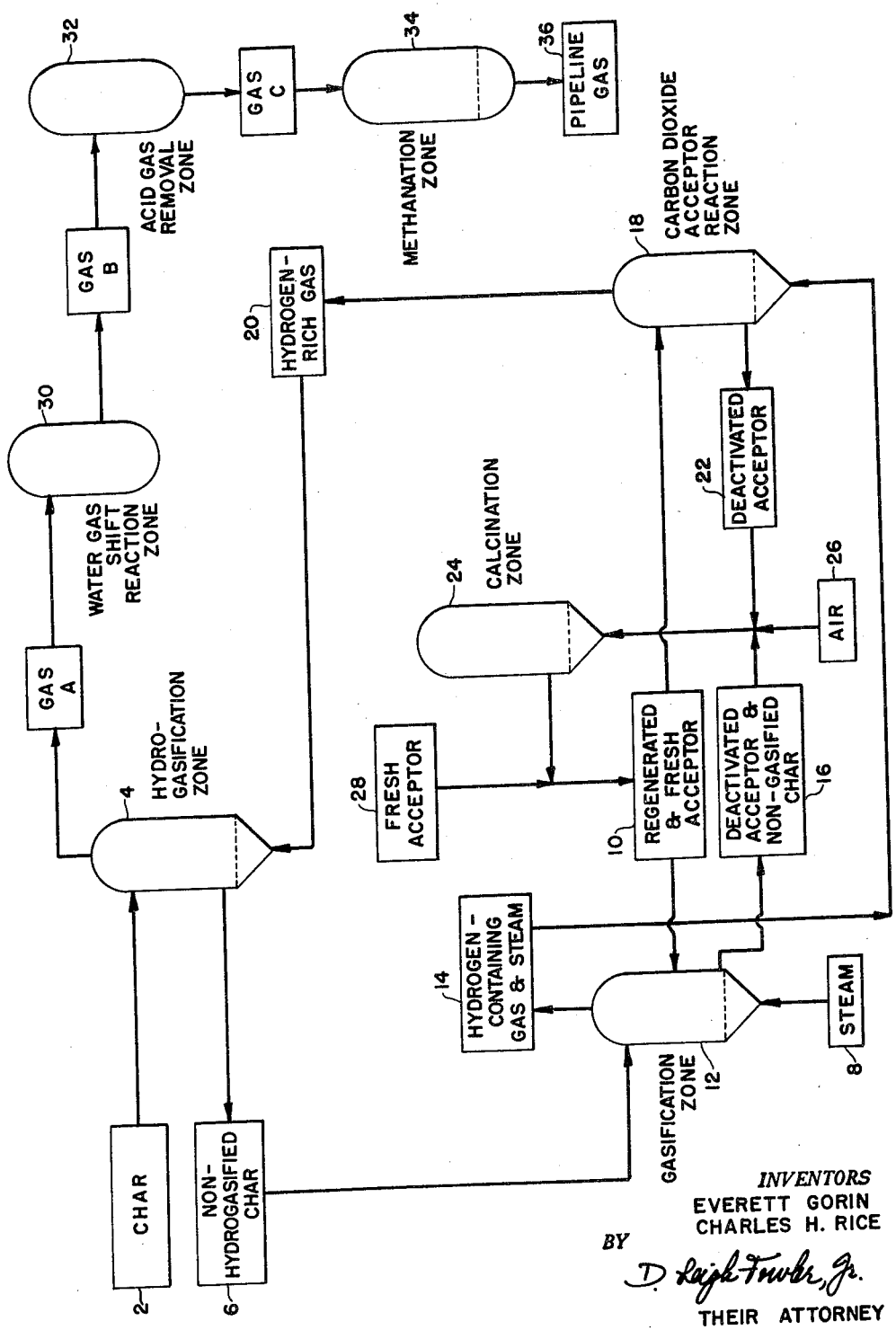

3,194,644
PRODUCTION OF PIPELINE GAS FROM
COALY SOLIDS
Everett Gorin and Charles H. Rice, Pittsburgh, Pa., assignors to Consolidation Coal Company, Pittsburgh, Pa., a corporation of Pennsylvania
Filed Mar. 30, 1962, Ser. No. 183,807
7 Claims. (Cl. 48—197)

This invention relates to an improved process for producing high B.t.u. gas, sometimes hereinafter referred to as pipeline gas, from coaly solids such as all ranks of coal and solids derived therefrom.

The term "pipeline gas," as hereinafter used, means a gas which has a heating value of at least 900 B.t.u. per cubic foot and which is substantially free of carbon monoxide.

Natural gas, which is predominantly methane, is the primary source of pipeline gas today. For many years, however, investigators have been attempting, without success, to develop an efficient and an economic process for producing a competitive pipeline gas from coal.

In order to readily substitute gas derived from the above solids for natural gas, it is necessary that the solids-derived gas have essentially the same heating value as natural gas, i.e., in the range of about 900 to 1000 B.t.u. per cubic foot. In addition, the solids-derived gas must also be of equivalent pipeline quality, that is, the solids-derived gas must be substantially free of carbon monoxide, and preferably be substantially all methane.

We have now developed an improved process for producing pipeline gas from coaly solids. More specifically, by the process of our invention we have reduced the cost of producing pipeline gas from coaly solids such as high volatile bituminous coal by as much as one-third.

A primary object of the present invention is to provide an improved process for producing pipeline gas from coaly solids, particularly, char, i.e., the solid product obtained from low-temperature carbonization of coal.

A further object of this invention is to provide a novel process for producing a coaly solids-derived gas having a heating value of at least 900 B.t.u. per cubic foot and containing substantially no carbon monoxide, which solids-derived gas can be efficiently and economically substituted for natural gas as pipeline gas.

In accordance with our invention, pipeline gas is produced from a coaly solid by initially hydrogasifying between 20 and 70 weight percent of the solid with steam and hydrogen. After 70 weight percent of the solid has been hydrogasified, the activity, i.e., the rate of reaction, of the remaining solid is too low for economic hydrogasification. The steam and the hydrogen react with the solid under elevated conditions of temperature and pressure to yield a gaseous hydrogasification product, sometimes hereinafter referred to as gas A, comprising hydrogen, carbon monoxide, carbon dioxide, and methane by the following reactions:

Reaction 1—hydrogenation reaction, $C+2H_2=CH_4$
Reaction 2—steam-carbon reaction, $C+H_2O=CO+H_2$
Reaction 3—steam-carbon reaction, $C+2H_2O=CO_2+2H_2$
Reaction 4—water gas shift reaction, $CO+H_2O=CO_2+H_2$ The remaining portion of the solid, i.e., the nonhydrogasified solid, and gas A are separately recovered from the hydrogasification zone. Gas A is converted subsequently to the desired pipeline gas by conventional processing steps, as hereinafter more fully explained. In order to supply at least a portion, and preferably all of the hydrogen used in the hydrogasification zone, at least a portion of the recovered solid is reacted with steam in the presence of a carbon dioxide acceptor such as lime in a gasification zone. The gasification zone is maintained at a lower pressure than the pressure in the hydrogasification zone. The following reactions take place in the gasification zone to produce a gaseous gasification product, sometimes hereinafter referred to as hydrogen-containing gas.

Reaction 2—steam-carbon reaction, $C+H_2O=CO+H_2$
Reaction 3—steam-carbon reaction, $C+2H_2O=CO_2+2H_2$
Reaction 4—water gas shift reaction, $CO+H_2O=CO_2+H_2$
Reaction 5—acceptor reaction, $CO_2+CaCO=CaCo_3$
(acceptor)

The hydrogen-containing gas is recovered from the gasification zone and may be introduced directly into the afore-mentioned hydrogasification zone.

We believe we are the first to realize that when coaly solids become too inactive for further economic hydrogasification, they are sufficiently active for gasification at a lower pressure to produce hydrogen, which is then used in the hydrogasification zone. Thus by selectively treating the coaly solid sequentially in a hydrogasification zone and a gasification zone, respectively, the maximum activity of the solid for each operation is obtained. However, we have found that not any conventional type gasification zone may be used, but to obtain an economic process the non-hydrogasified solids must be gasified in the presence of a carbon dioxide acceptor.

By using a carbon dioxide acceptor in the gasification zone, both the hydrogasification zone and the gasification zone are essentially thermoneutral, i.e., no external heat is necessary to maintain the desired reactions. In the hydrogasification zone, the heat for the endothermic steam-carbon reaction (Reactions 2 and 3) is supplied by the exothermic hydrogenation reaction (Reaction 1). In the gasification zone, the heat for the endothermic steam-carbon reaction (Reactions 2 and 3) is supplied by the exothermic acceptor reaction (Reaction 5).

For a better and more complete understanding of our invention, its objects and advantages, reference should be had to the following description and to the accompanying drawing which is a schematic illustration of a preferred embodiment of this invention.

In the following description of the preferred embodiment of our invention, by way of example only, our new process is applied to char obtained from high volatile bituminous coal such as Pittsburgh seam bituminous coal. Char is the solid product that remains following the low-temperature carbonization of coal at a temperature in the range of about 800 to 1400° F. If desired, however, any coaly solid, i.e., all ranks of coal and solids derived therefrom, may be used in the process of our invention.

If caking coal is used, it is desirable to decake the coal prior to introduction into the hydrogasification zone, e.g., the coal may be contacted with an oxygen-containing gas at about 600° F. to accomplish the desired decaking. If caking coal is not decaked prior to hydrogasification, the coal may agglomerate due to the thermal conditions maintained therein and thus cause operability problems.

PREFERRED EMBODIMENT

The following, with reference to the drawing, is a description of the preferred embodiment of this invention. Briefly, the preferred embodiment comprises:

(I) a hydrogasification zone 4, wherein char is hydrogasified to yield gas A and non-hydrogasified char;
(II) a gasification zone 12, wherein non-hydrogasified char is reacted with steam in the presence of a carbon dioxide acceptor to yield a hydrogen-containing gas;
(III) a carbon dioxide acceptor reaction zone 18, wherein hydrogen-containing gas is contacted with carbon dioxide acceptor to yield a hydrogen-rich gas having a lower carbon dioxide content than the hydrogen-containing gas;
(IV) a calcination zone 24, wherein deactivated acceptor from both the acceptor reaction zone 18 and the gasification zone 12 is regenerated;
(V) a water gas shift reaction zone 30, wherein gas A is treated to yield gas B;
(VI) an acid gas removal zone 32, wherein gas B is treated to yield gas C; and
(VII) a catalytic methanation zone 34, wherein gas C is treated to yield pipeline gas.

HYDROGASIFICATION ZONE

Char, 2, is introduced into a hydrogasification zone 4 wherein the char is reacted with hydrogen and steam to yield a gaseous hydrogasification product, i.e., gas A. Gas A comprises hyrogen, methane, carbon monoxide, and acid gas. By acid gas we mean carbon dioxide and compounds of sulfur, e.g., hydrogen sulfide. Gas A an the remainder of the char, i.e., non-hydrogasified char 6, are separately recovered from the zone 4.

It is important to note that not only is the desired high B.t.u. methane being formed in the hydrogasification zone 4 by the afore-mentioned exothermic hydrogenation reaction (Reaction 1), but the heat evolved from Reaction 1 maintains the endothermic steam-carbon reaction (Reactions 2 and 3), whereby carbon monoxide and hydrogen are produced. The carbon monoxide and hydrogen are subsequently catalytically methanated to form additional methane by the following reaction:

Reaction 6—methanation reaction, $CO + 3H_2 = CH_4 + H_2O$

If desired, gas A may be introduced directly into a methanation zone to produce the product pipeline gas; however, because gas A normally contains excessive amounts of acid gas and gas A does not normally contain the desired mole ratio of hydrogen to carbon monoxide, gas A is preferably treated in a water gas shift reaction zone and an acid gas removal zone, respectively, prior to catalytic methanation, as more fully explained hereinafter.

Between 20 and 70 weight percent of the char 2 is consumed in the hydrogasification zone 4, for example, by reaction with hydrogen and steam according to the previously described hydrogenation reaction and steam-carbon reaction. Theoretically, all of the char 2 can be consumed in the hydrogasification zone 4; however, we have found that after about 70 weight percent of the char is consumed, the rate of reaction (activity) of the remaining char is too slow for economic operation. On the other hand, it is necessary to hydrogasify at least 20 weight percent of the char to obtain an economic process. Preferably, 50 weight percent of the char 2 is consumed in the hydrogasification zone 4.

Ordinarily the hydrogasification zone will be operated adiabatically whereby a temperature gradient is maintained therein. A maximum temperature of 1800 to 2000° F. will be maintained in the gas inlet (lower part) of the zone, and a minimum temperature of 1200 to 1600° F. will be maintained in the gas outlet (upper part) of the zone. If it is desired, however, isothermal conditions may be maintained in the hydrogasification zone. The hydrogasification zone is maintained at a pressure in the range of 50 to 150 atmospheres.

The hydrogasification reaction zone 4 may be any of the conventional type contacting zones. For example, continuous, semi-continuous, or batch operations may be used. The char may be employed in the zone 4 in the form of a fixed, gravitating, or fluidized bed. Preferably, the char is maintained in the form of a gravitating bed whereby the above described temperature gradient is maintained.

When it is desired to use isothermal conditions in the hydrogasification zone, then a hydrogasification zone such as described in Gorin U.S. Patent No. 2,654,661, may be used.

GASIFICATION ZONE

As previously mentioned, when the activity of the non-hydrogasified char 6 is too low for further economic hydrogasification, we have found that these solids are still sufficiently active for treatment in a gasification zone to produce at least a portion, and preferably all, of the hydrogen used in the hydrogasification zone. The reason the hydrogasified solids are still sufficiently active for gasification is because the gasification zone is maintained at a lower pressure than the hydrogasification zone. The steam-carbon reaction which takes place during gasification is favored by lower pressures.

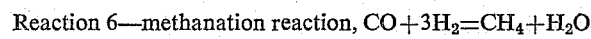

Non-hydrogasified char 6, steam 8, and carbon dioxide acceptor particles 10, are introduced into a gasification zone 12. If the supply of non-hydrogasified char 6 is insufficient to produce the necessary amount of hydrogen for the hydrogasification zone 4, the supply may be supplemented with some char 2 or any coaly solid. The steam and char react in the zone 12 (via the steam-carbon reactions 2 and 3) to yield hydrogen, carbon dioxide, and carbon monoxide. As carbon dioxide forms it is immediately absorbed on the acceptor particles thereby enhancing the formation of additional hydrogen by the steam-carbon reaction. The heat evolved by the exothermic carbon dioxide acceptor reaction (Reaction 5) is sufficient to maintain the endothermic steam-carbon reactions, i.e., substantially thermoneutral conditions prevail in the gasification zone 12.

A mixture 14 of hydrogen-containing gas and unreacted steam is recovered from the zone 12. The hydrogen-containing gas comprises hydrogen and the oxides of carbon. As the acceptor particles becomes saturated with carbon dioxide, it is necessary to regenerate them for further use. Thus deactivated acceptor particles 16 in admixture with non-gasified char are withdrawn from the zone 12 separately from the hydrogen-containing gas mixture 14.

The hydrogen-containing gas may be introduced directly into the hydrogasification zone 4 to supply at least a portion and preferably all of the hydrogen used therein. Preferably, however, the hydrogen-containing gas is subjected to a carbon dioxide acceptor reaction to remove excessive carbon dioxide therefrom, as hereinafter more fully discussed with reference to the carbon dioxide acceptor reaction zone.

The gasification zone 12 is maintained at a temperature in the range of 1400 to 1800° F., preferably 1550 to 1750° F., and at a pressure in the range of 5 to 40 atmospheres.

The gasification reaction zone 12 may be any of the conventional type contacting zones. For example, continuous, semi-continuous, or batch operation may be used. The char and carbon dioxide acceptor particles may be employed in the form of a fixed, gravitating, or fluidized bed. Preferably, acceptor particles and char are maintained in the form of a fluidized bed in the reaction zone 12, the fluidizing medium being upwardly flowing steam 8. The conditions and mode of operation of the gasification zone 12 are further discussed in our copending application Serial No. 113,322, filed May 29, 1961, and now U.S. Patent 3,115,394, which is assigned to the assignee of the present application.

The carbon dioxide acceptor may be any of the conventional type carbon dioxide acceptors employed by those skilled in the art. Preferably, the acceptor is an alkaline earth oxide, i.e., an oxide of calcium, barium, or strontium. Because of cheapness and abundance of supply, calcium oxide, better known as lime, is normally employed. Lime-bearing natural materials such as dolomite and synthetic acceptor materials such as lime deposited on α-alumina or magnesia may also be used.

If lime is employed as the acceptor, it is important to note that the partial pressure of steam within the zone 12 should be maintained below the critical value of 13 atmospheres as discussed in Gorin U.S. Patent No. 2,705,672, assigned to the assignee of this application. If the partial pressure of steam is above about 13 atmospheres, the individual particles of lime and calcium carbonate (the lime is converted to calcium carbonate as it absorbs the carbon dioxide) tend to agglomerate, thereby prohibiting fluidization. In order to maintain the steam partial pressure below about 13 atmospheres and still maintain the total pressure above 13 atmospheres, a portion of the mixture 14 is recycled (not shown) to the zone 12 and the steam 8 is introduced into the zone 12 at a partial pressure below about 13 atmospheres. The details concerning the control of the steam partial pressure are further discussed in Gorin U.S. Patent No. 2,705,672.

CARBON DIOXIDE ACCEPTOR REACTION ZONE

The mixture 14 of hydrogen-containing gas and steam is introduced into a carbon dioxide acceptor reaction zone 18 wherein the mixture is contacted with carbon dioxide acceptor particles 10. It is desirable to remove at least a portion of the carbon dioxide from the hydrogen-containing gas before introducing the gas into the hydrogasification zone 4 in order to maintain a high hydrogen partial pressure in the hydrogasification zone, thus enabling a lower total pressure to be used therein.

Because all of the reactions in the acceptor zone 18 are exothermic, it is desirable to cool the hydrogen-containing gas to below about 400° F. before introducing it into the acceptor reaction zone 18.

Carbon dioxide contained in the mixture 14 is absorbed on the acceptor as previously described with reference to the gasification zone. Carbon monoxide contained in the mixture 14 reacts with steam (via the water gas shift Reaction 4) to produce additional carbon dioxide and hydrogen. As the carbon dioxide forms, it is absorbed on the acceptor particles. As a result of the above reactions, hydrogen-rich gas 20, which is introduced subsequently into the hydrogasification zone 4, is recovered from the zone 18.

Deactivated acceptor 22 is withdrawn from the zone 18 in order to regenerate the acceptor for further use therein. The acceptor reaction zone 18 may be any conventional type contacting zone, as previously discussed with reference to the gasification zone 12. Preferably, the acceptor particles are maintained in the zone 18 in the form of a fluidized bed, the fluidizing medium being upwardly flowing mixture 14.

The zone 18 is maintained at a temperature in the range of 1200 to 1600° F., preferably 1400 to 1550° F., and at substantially the same or slightly lower pressure than in the gasification zone 12.

Normally, the hydrogen-rich gas 20 is recovered from the acceptor reaction zone 18 in admixture with steam. Because of the much higher pressure maintained in the hydrogasification zone 4 than in the acceptor reaction zone 18 the mixture is cooled to condense steam, which is then removed. The hydrogen-rich gas is then compressed to the hydrogasification pressure, preheated, and introduced into the hydrogasification zone 4 in admixture with pressurized steam.

CALCINATION ZONE

As the carbon dioxide acceptor particles absorb carbon dioxide, the individual particles eventually become saturated and, thus, to be of further use must be regenerated, i.e., the carbon dioxide must be evolved. Carbon dioxide acceptor particles 22 withdrawn from the acceptor reaction zone 18 are conveyed in admixture with the afore-mentioned mixture 16 of non-gasified char and carbon dioxide acceptor particles into a calcination zone 24. A carrier gas, for example, air 26, is used to convey the solids into the calcination zone 24.

Preferably, sufficient quantities of air are employed so as to maintain the solids in the form of a fluidized bed within the calcination zone 24.

The calcination zone 24 is maintained at a temperature in the range of 1700 to 2000° F., at which temperature carbon dioxide is evolved from the acceptor particles. The calcination zone is maintained at a pressure in the range of 5 to 40 atmospheres.

In order to supply the heat for calcination, at least a portion of the char is combusted with the air in the presence of the acceptor. Alternatively, the heat for calcination of the acceptor may be supplied by burning an auxiliary fuel in an external combustion chamber and using the sensible heat of the hot flue gases as the heat source.

Regenerated acceptor particles are withdrawn from the calcination zone and admixed (if desired) with fresh acceptor 28 to form mixture 10 which is reintroduced into the gasification reaction zone 12 and the acceptor reaction zone 18. Fresh acceptor particles 28 are added normally to make up for any loss, for example, because of attrition. A further discussion of conditions and mode of operation of the calcination zone 24 is in our copending application, supra.

Where lime is used as the acceptor and the coally solid used in the gasification zone contains sulfur, it is preferable to use a two-stage calcination zone; one stage being used as an oxidation zone and the other stage as a reducing zone. Thus any calcium sulfide that is formed will be regenerated to lime, as further discussed in Gorin et al. U.S. Patent 2,824,047, which is assigned to the assignee of this application.

WATER GAS SHIFT REACTION ZONE

Gas A (obtained from the hydrogasification zone 4) is preferably introduced into a conventional-type water gas shift reaction zone 30, wherein gas A is reacted with steam to yield gas B having a hydrogen to carbon monoxide mole ratio slightly in excess of 3 to 1, preferably between 3 to 1 and 3.2 to 1. If the mole ratio is too much below 3 to 1, the desired stoichiometric amount of hydrogen will not be present to react with the carbon monoxide during the subsequent methanation step; and as a result, carbon monoxide and carbon dioxide will be present in the product pipeline gas. One the other hand, if the mole ratio is too much above 3 to 1, the product pipeline gas will contain excessive hydrogen which lowers the B.t.u. value of the product pipeline gas below acceptable limits (the lower acceptable B.t.u. value generally being 900 B.t.u.'s).

In general, the water gas shift reaction zone 30 is maintained at a temperature in the range of 600 to 900° F., preferably at a temperature in the range of 700 to 800° F., and at substantially the same pressure as used in the hydrogasification zone 4.

ACID GAS REMOVAL ZONE

In addition to methane and the desired mole ratio of hydrogen to carbon monoxide, gas B also contains acid gas, i.e., carbon dioxide and compounds of sulfur. The coaly solids used in this invention generally contain sulfur; therefore, when the solids are hydrogasified in zone 4, hydrogen reacts with the sulfur to form hydrogen sulfide.

If desired, gas B may be introduced directly into a methanation zone without further treatment. However, it is preferred to remove substantially all of the acid gas prior to methanation. Compounds of sulfur must be removed because they readily poison methanation catalyst. If carbon dioxide is not removed, the carbon dioxide reacts with hydrogen during methanation to form methane, thereby increasing the amount of hydrogen that must be added to the methanation zone.

Gas B is treated in any conventional type acid gas removal zone 32 to produce gas C, which is substantially free of acid gas. Gas C contains primarily methane, carbon monoxide, and hydrogen.

Any of the well-known methods for removing carbon dioxide and compounds of sulfur from gases may be used. For example, carbon dioxide and hydrogen sulfide may be removed by contacting the gas with a hot carbonate solution. Correspondingly, trace amounts of compounds of sulfur such as hydrogen sulfide and carbon disulfide may be removed by contacting the gas with iron oxide and active carbon.

METHANATION ZONE

Gas C is introduced into any conventional type methanation zone 34. The carbon monoxide and hydrogen contained in gas C are reacted in the presence of a methanation catalyst by the aforementioned methanation Reaction 6 to yield a pipeline gas 36 comprising substantially pure methane.

The methanation zone 34 is maintained at a temperature in the range of 600 to 900° F., preferably 650 to 800° F., and at susbtantially the same pressure as used in the hydrogasification zone 4. The methanation catalyst may be any of the conventional catalysts employed by those skilled the art. For example, Raney nickel or supported nickel catalyst such as nickel on kieselguhr may be used.

The methanation zone 34 may be any of the conventional type contacting zones. For example, continuous, semicontinuous, or batch operations may be used. The methanation catalyst may be employed in the form of a fixed or fluidized bed. Preferably, the catalyst is maintained in the form of a fixed bed in the reaction zone 34.

Pipeline gas 36 is withdrawn from the methanation zone 34. The pipeline gas has a heating value of at least 900 B.t.u.'s per cubc foot and comprises primarily more than 90 volume percent methane.

Example

The following is a working example of the preferred embodiment of this invention. About 348 pounds (on a moisture-free and ash-free basis) for char obtained from the low temperature carbonization of Pittsburgh seam bituminous coal is introduced into a gravitating bed (adiabatic) hydrogasification zone maintained at 100 atmospheres and at a temperature ranging from 1500 to 2000° F. Approximately 50 weight percent of the char is reacted therein with a mixture of steam and hydrogen-rich gas (feed gas analysis shown in Table I) to yield gas A (analysis shown in Table I). Gas A and the remaining non-hydrogasified char (160.5 pounds) are separately recovered from the hydrogasification zone.

Gas A is introduced into a water gas shift reaction zone maintained at 800° F. and approximately 100 atmospheres to yield gas B (analysis shown in Table I). Gas B is introduced into a hot carbonate purification zone wherein substantially all of the acid gas is removed to yield gas C (analysis shown in Table I). Gas C is then introduced into a catalytic methanation zone in the presence of a Raney nickel catalyst at 700° F. and approximately 100 atmospheres to yield pipeline gas (analysis shown in Table I).

The non-hydrogasified char (160.5 pounds) is introduced into a fluidized bed gasification zone maintained at 1650° F. and about 20 atmospheres wherein the char is reacted in the presence of 304 pounds of lime with steam to yield a hydrogen-containing gas. The hydrogen-containing gas is then reacted in a fluidized bed carbon dioxide acceptor reaction zone with 150 pounds of lime at 1470° F. and about 19 atmospheres to yield the aforementioned hydrogen-rich gas.

TABLE I
[Moles of gases]

| | Hydrogen-rich gas plus steam | Gas A | Gas B | Gas C | Product Pipeline Gas |
|---|---|---|---|---|---|
| $H_2$ | 10.5 | 7.5 | 8.2 | 8.2 | 0.3 |
| $CH_4$ | 1.5 | 6.6 | 6.6 | 6.6 | 9.2 |
| $C_2+$ | | 0.1 | 0.1 | 0.1 | 0.1 |
| $CO$ | 0.3 | 3.3 | 2.6 | 2.6 | |
| $CO_2$ | 0.3 | 1.8 | 2.5 | 0.1 | 0.1 |
| $H_2S$ | | 0.1 | 0.1 | | |
| $H_2O$ | 7.3 | 4.3 | 3.6 | | |
| Total | 19.9 | 23.7 | 23.7 | 17.6 | 9.7 |

The thermal efficiency obtained by converting the 348 pounds of char to the product pipeline gas by the above process is about 71.5 percent.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

The embodiments of the invention in which an exclusive property or privilege is claimed are defined as follows:

1. A process for producing pipeline gas from coaly solids, which process comprises
   (a) introducing said solids into a hydrogasification zone wherein between 20 and 70 weight percent thereof is reacted with hydrogen and steam at a temperature in the range of 1200 to 2000° F. and at a pressure in the range of 50 to 150 atmospheres to yield gas A comprising methane, hydrogen, and carbon monoxide,
   (b) recovering said gas A from said hydrogasification zone,
   (c) separately recovering the remainder of said solids from said hydrogasification zone,
   (d) gasifying at least a portion of the recovered solids with steam in the presence of a carbon dioxide acceptor in a gasification zone maintained at a temperature in the range of 1400 to 1800° F. and at a pressure in the range of 5 to 40 atmospheres to yield a hydrogen-containing gas,
   (e) recovering said hydrogen-containing gas from said gasification zone, said gas being introduced subsequently into said hydrogasification zone of step (a) to supply at least a portion of said hydrogen used therein, and
   (f) thereafter catalytically methanating gas A under conditions to yield pipeline gas.

2. A process for producing pipeline gas from coaly solids, which process comprises
   (a) introducing said solids into a hydrogasification zone wherein between 20 and 70 weight percent thereof is reacted with hydrogen and steam at a temperature in the range of 1200 to 2000° F. and at a pressure in the range of 50 to 150 atmospheres to yield gas A comprising methane, hydrogen, and carbon monoxide,
   (b) recovering said gas A from said hydrogasification zone, (c) separately recovering the remainder of said solids from said hydrogasification zone, (d) gasifying a portion of the recovered solids with steam in the presence of a carbon dioxide acceptor in a gasification zone maintained at a temperature in the range of 1400 to 1800° F. and at a pressure in the range of 5 to 40 atmospheres to yield a hydrogen-containing gas, (e) recovering said hydrogen-containing gas from said gasification zone, said gas being introduced subsequently into said hydrogasification zone of step (a) to supply substantially all of said hydrogen used therein, (f) subjecting said gas A from step (b) to a water gas shift reaction under conditions to yield gas B comprising methane, acid gas, hydrogen, and carbon monoxide, said hydrogen and carbon monoxide being present in gas B in a mole ratio slightly in excess of 3 to 1, respectively, (g) removing substantially all of said acid gas from gas B, whereby gas C is obtained, said gas C comprising methane, hydrogen, and carbon monoxide, and (h) thereafter catalytically methanating gas C under conditions to yield pipeline gas.

3. A process for producing pipeline gas from coaly solids, which process comprises (a) introducing said solids into a hydrogasification zone wherein between 20 and 70 weight percent thereof is reacted with hydrogen and steam at a temperature in the range of 1200 to 2000° F. and at a pressure in the range of 50 to 150 atmospheres to yield gas A comprising methane, hydrogen, and carbon monoxide, (b) recovering said gas A from said hydrogasification zone, (c) separately recovering the remainder of said solids from said hydrogasification zone, (d) gasifying a portion of the recovered solids with steam in the presence of a carbon dioxide acceptor in a gasification zone maintained at a temperature in the range of 1400 to 1800° F. and at a pressure in the range of 5 to 40 atmospheres to yield a hydrogen-containing gas comprising carbon dioxide, (e) recovering said hydrogen-containing gas from said gasification zone, (f) contacting said hydrogen-containing gas with a carbon dioxide acceptor in an acceptor reaction zone under conditions to remove at least a portion of the carbon dioxide contained therein, whereby a hydrogen-rich gas is obtained, (g) recovering said hydrogen-rich gas from said acceptor reaction zone, said hydrogen-rich gas being introduced subsequently into said hydrogasification zone of step (a) to supply substantially all of said hydrogen used therein, (h) subjecting said gas A from step (b) to a water gas shift reaction under conditions to yield gas B comprising methane, acid gas, hydrogen, and carbon monoxide, said hydrogen and carbon monoxide being present in gas B in a mole ratio slightly in excess of 3 to 1 respectively, (i) removing substantially all of said acid gas from gas B, whereby gas C is obtained, said gas C comprising methane, hydrogen, and carbon monoxide, and (j) thereafter methanating gas C in the presence of a methanation catalyst under conditions to yield pipeline gas.

4. A process for producing pipeline gas from coaly solids, which process comprises (a) introducing said solids into a hydrogasification zone wherein 50 weight percent thereof is reacted with hydrogen and steam at a temperature in the range of 1200 to 2000° F. and at a pressure in the range of 50 to 150 atmospheres to yield gas A comprising methane, hydrogen, and carbon monoxide, (b) recovering said gas A from said hydrogasification zone, (c) separately recovering the remainder of said solids from said hydrogasification zone, (d) gasifying a portion of the recovered solids with steam in the presence of a carbon dioxide acceptor in a gasification zone maintained at a temperature in the range of 1400 to 1800° F. and at a pressure in the range of 5 to 40 atmospheres to yield a hydrogen-containing gas comprising carbon dioxide, (e) recovering a mixture of carbon dioxide acceptor particles and non-gasified solids from said gasification zone, (f) separately recovering said hydrogen-containing gas from said gasification zone, (g) contacting said hydrogen-containing gas with a carbon dioxide acceptor in an acceptor reaction zone under conditions to remove at least a portion of said carbon dioxide contained therein, whereby a hydrogen-rich gas is obtained, (h) recovering said hydrogen-rich gas from said acceptor reaction zone, said hydrogen-rich gas being introduced subsequently into said hydrogasification zone of step (a) to supply substantially all of said hydrogen used therein, (i) separately recovering carbon dioxide acceptor particles from said acceptor reaction zone, (j) regenerating at least a portion of said acceptor particles from step (e) and said recovered acceptor particles from step (i) in a calcination zone wherein at least a portion of said nongasified solids from step (e) are combusted to provide the heat to regenerate the carbon dioxide acceptor particles, (k) reintroducing regenerated carbon dioxide acceptor particles into said gasification zone and into said acceptor reaction zone, (l) subjecting said gas A from step (b) to a water gas shift reaction under conditions to yield gas B comprising methane, acid gas, hydrogen, and carbon monoxide, said hydrogen and carbon monoxide being present in gas B in a mole ratio slightly in excess of 3 to 1, respectively, (m) removing substantially all of said acid gas from gas B, whereby gas C is obtained, said gas C comprising methane, hydrogen, and carbon monoxide, and (n) thereafter methanating gas C in the presence of a methanation catalyst under conditions to yield pipeline gas.

5. The process of claim 4 wherein the coaly solid is char obtained by the low temperature carbonization of coal.

6. The process of claim 4 wherein the carbon dioxide acceptor particle is calcium oxide.

7. A process for producing pipeline gas from coaly solids which are obtained by low temperature carbonization of coal at a temperature in the range of about 800 to 1400° F., which process comprises (a) introducing said solids into a hydrogasification zone wherein between 20 and 70 weight percent thereof is reacted with hydrogen and steam at a temperature in the range of 1200 to 2000° F. and at a pressure in the range of 50 to 150 atmospheres to yield gas A comprising methane, hydrogen, and carbon monoxide, (b) recovering said gas A from said hydrogasification zone, (c) separately recovering the remainder of said solids from said hydrogasification zone, (d) gasifying a portion of the recovered solids with steam in the pressence of a carbon dioxide acceptor in a gasification zone maintained at a temperature in the range of 1400 to 1800° F. and at a pressure in the range of 5 to 40 atmospheres to yield a hydrogen-containing gas comprising carbon dioxide, (e) recovering said hydrogen-containing gas from said gasification zone, (f) contacting said hydrogen-containing gas with a carbon dioxide acceptor in an acceptor reaction zone under conditions to remove at least a portion of the carbon dioxide contained therein, whereby a hydrogen-rich gas is obtained, (g) recovering said hydrogen-rich gas from said acceptor reaction zone, said hydrogen-rich gas being introduced subsequently into said hydro-gasification zone of step (a) to supply substantially all of said hydrogen used therein, (h) subjecting said gas A from step (b) to a water gas shift reaction under conditions to yield gas B comprising methane, acid gas, hydrogen, and carbon monoxide, said hydrogen and carbon monoxide being present in gas B in a mole ratio slightly in excess of 3 to 1, respectively, (i) removing substantially all of said acid gas from gas B, whereby gas C is obtained, said gas C comprising methane, hydrogen, and carbon monoxide, and (j) thereafter methanating gas C in the presence of a methanation catalyst under conditions to yield pipeline gas.

References Cited by the Examiner

UNITED STATES PATENTS

| | | | |
|---|---|---|---|
| 719,360 | 1/03 | Oppelt | 48—202 XR |
| 2,654,661 | 10/53 | Gorin | 48—197 |
| 2,662,816 | 12/53 | Kalbach | 48—202 |
| 2,682,455 | 6/54 | Gorin | 48—197 |
| 2,682,456 | 6/54 | Gorin | 48—197 |

FOREIGN PATENTS 640,907 8/50 Great Britain.

MORRIS O. WOLK, *Primary Examiner.*